United States Patent [19]

Bernstein

[11] Patent Number: 5,310,299
[45] Date of Patent: May 10, 1994

[54] SLIDING CLAMP

[75] Inventor: Leon M. Bernstein, Minnetonka, Minn.

[73] Assignee: Kurt Manufacturing Company, Inc., Fridley, Minn.

[21] Appl. No.: 939,070

[22] Filed: Sep. 1, 1992

[51] Int. Cl.[5] .............................. F16B 19/00; B25B 1/08
[52] U.S. Cl. .................................... 411/354; 411/393; 269/229; 269/234
[58] Field of Search ............... 411/191, 192, 354, 393; 269/234, 235, 305, 229, 232, 233; 403/343

[56] References Cited

U.S. PATENT DOCUMENTS

| D. 302,277 | 7/1989 | Bishop | D15/140 |
| 449,039 | 3/1891 | Fietsch, Jr. | 269/235 |
| 744,559 | 11/1903 | Kendrick | 269/234 |
| 1,017,846 | 2/1912 | Budlong | 269/229 X |
| 1,102,814 | 7/1914 | Streit | |
| 1,685,899 | 10/1928 | Andrew | |
| 2,000,239 | 5/1935 | Linn | 269/229 |
| 2,092,372 | 9/1937 | Goeller | 269/234 |
| 2,430,613 | 11/1947 | Hodge | 411/354 |
| 2,587,025 | 2/1952 | Beck et al. | 90/61 |
| 2,625,861 | 1/1953 | Swanson | 269/234 |
| 3,473,420 | 10/1969 | Boggs | 77/63 |
| 3,866,898 | 2/1975 | Spengler | 269/138 |
| 3,893,813 | 7/1975 | Johnson | 23/292 |
| 4,139,188 | 2/1979 | Avedian | 269/229 |
| 4,804,171 | 2/1989 | Dornfeld | 269/234 |
| 4,805,888 | 2/1989 | Bishop | 269/99 |
| 5,035,411 | 7/1991 | Daines et al. | 269/231 |

OTHER PUBLICATIONS

Mitee-Bite Products Company, "Meeting the Needs of Our Customers", pp. 1, 3, 7.

Primary Examiner—Neill R. Wilson
Attorney, Agent, or Firm—Westman, Champlin & Kelly

[57] ABSTRACT

A device for holding a workpiece or part in a desired position. The device has a platen with a stop, a threaded shank actuator and a sliding clamping member. The actuator has a tapered head which engages a conical bore of the sliding clamping member simultaneously to apply clamping forces against a workpiece and securing forces to anchor the sliding clamp member to the platen.

20 Claims, 2 Drawing Sheets

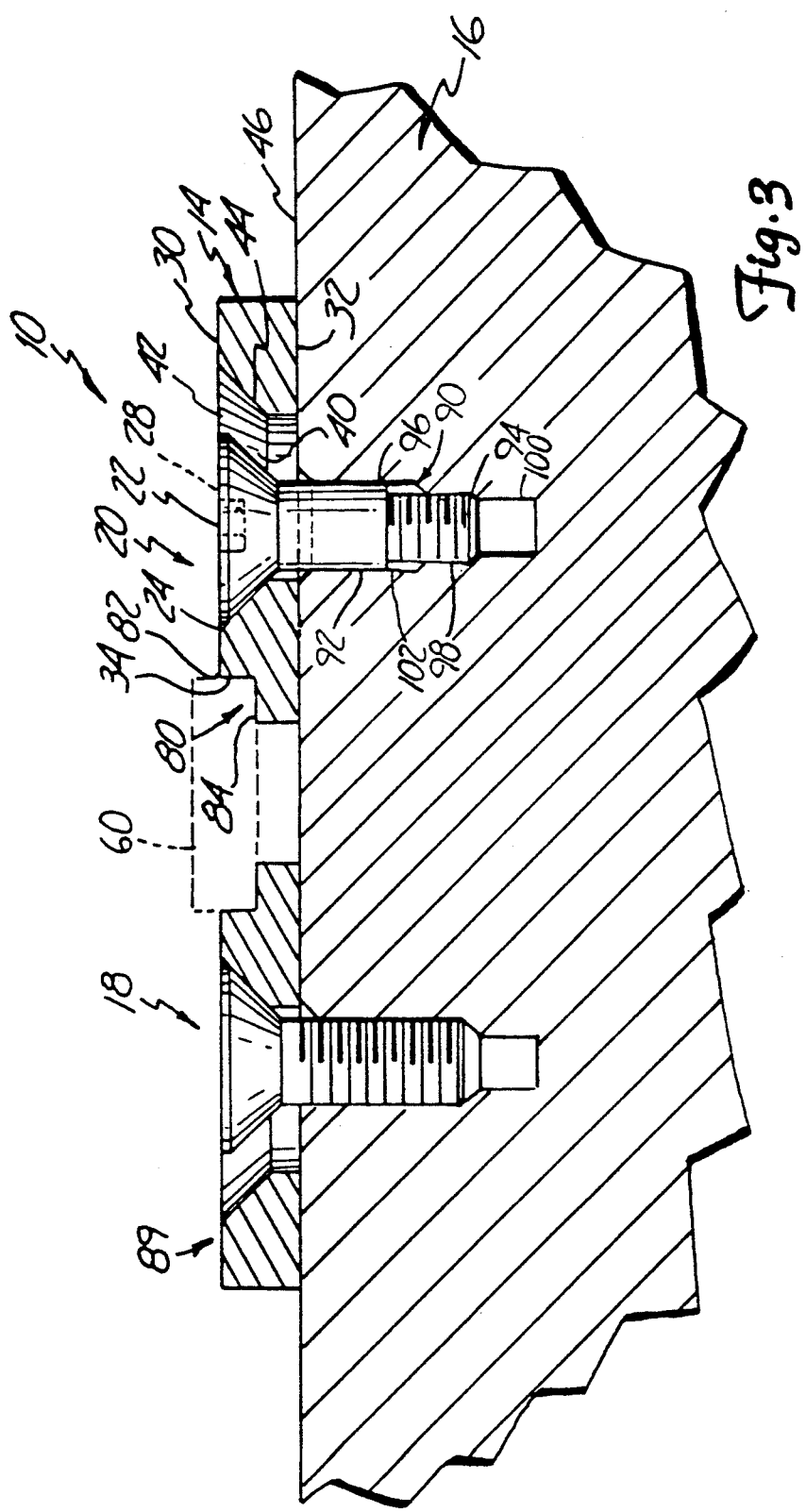

SLIDING CLAMP

BACKGROUND OF THE INVENTION

The present invention relates to a device for securely holding a workpiece or a part, like a fastener. More particularly, the present invention relates to a device having a clamping action provided by a sliding member which engages and urges the workpiece against a stop.

Many mechanical operations require that one or more workpieces be held stationary for a period of time. Various types of clamps and other devices are known in the art for securing a workpiece in a desired position to facilitate an operation on the workpiece.

An apparatus for securing one or more workpieces is shown in Bishop U.S. Pat. No. 4,805,888, issued Feb. 21, 1989. The Bishop patent describes an orbital action clamp comprised of a bolt-like member, a sliding clamp member and a mounting platen. The bolt-like member is formed of a threaded shaft and an eccentric head. The sliding clamp member has a centered through bore adapted to receive the shaft of the bolt-like member. A larger bore, concentric with the through bore, accepts the head and provides a shoulder such that the head will nest within the larger bore. The threaded section of the bolt-like member engages a threaded bore in the mounting platen.

Rotation of the Bishop bolt-like member results in an orbital action by the head. That is, rotation of the eccentric head within the clamp member produces a camming action against a wall of the large bore of the clamp member. This camming action produces a sliding motion in the clamp member which engages the workpiece against the stop.

In most cases, the Bishop clamp member will be fully engaged with the workpiece without being securely anchored to the platen. In some cases, the head will tighten against the shoulder of the clamp member before the workpiece is fully engaged. Rarely will the workpiece be fully engaged and the clamp member be securely anchored to the platen.

SUMMARY OF THE INVENTION

The present invention provides a device having a sliding clamp member which fully engages a workpiece against a stop while being simultaneously anchored to a platen. The clamping device is comprised of an actuator-fastener, a clamping member and a platen.

The fastener may be a standard flat-head bolt formed with a threaded shaft and a tapered head, the taper forming an outer peripheral bearing surface. Preferably, the tapered surfaces or curved side surfaces have a contact angle between 30° and 45° as measured from the longitudinal axis of the fastener. The clamping member has a through bore adapted to receive the threaded shaft. A conical bore, concentric with and larger than the through bore, accepts the head and provides an inner peripheral bearing surface. The threaded shaft of the fastener engages a threaded bore in the platen.

The clamping member has a clamping surface, which may have different shapes to clamp different types of workpieces. For example, the clamping member can be rectangular, square, hexagonal, triangular or round. In addition, the clamping member can clamp two parts simultaneously when the conical bore is positioned between the parts. The clamping member can rotate slightly about the conical bore such that approximately equal clamping forces are applied to each part when the fastener is tightened.

As the fastener threads are turned to engage the threads of the platen, the outer bearing surface of the tapered head is drawn toward the platen and into engagement with the inner bearing surface of the conical bore. The resulting force on the clamping member urges the clamping member toward the workpiece. The clamping member will "slide" toward the workpiece, engage the workpiece and clamp the workpiece against the stop. Simultaneously the force on the clamping member will urge the clamping member toward the platen to anchor the a clamping member to the platen when the workpiece is clamped against the stop. Generally, the clamping forces of the clamping member upon the part and the securing friction forces holding the clamping member to the platen are related to the tapered contact surfaces. For example, the clamping forces and the securing forces are approximately equal for tapered contact surfaces of 45°.

BRIEF DESCRIPTION OF THE DRAWINGS

FIG. 3 is a front sectional view of the clamping device having an alternative fastener.

DETAILED DESCRIPTION OF THE PREFERRED EMBODIMENTS

Figure 1:
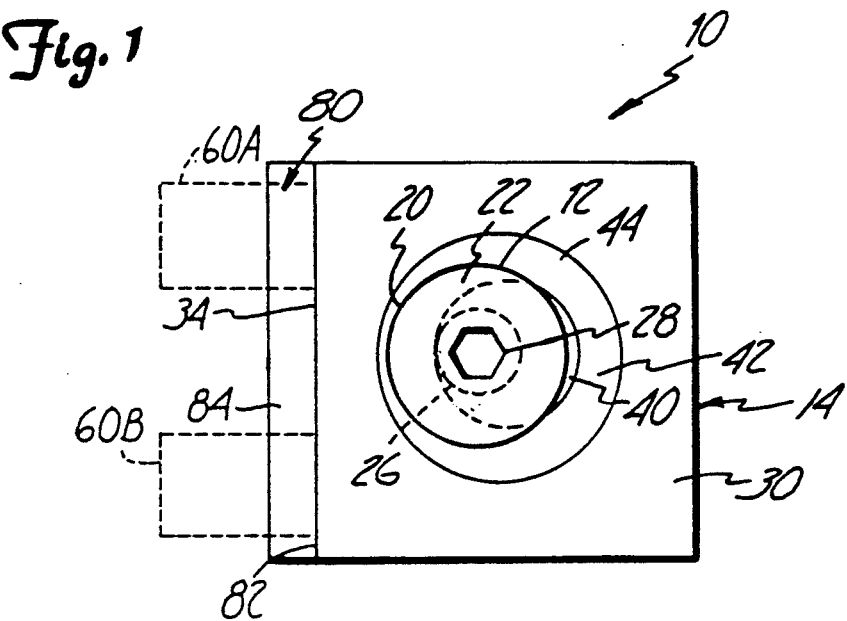
FIG. 1 is a top view of a clamping device made in accordance with the present invention.

A preferred embodiment of a clamping device in accordance with the present invention, is shown in FIG. 1 and designated generally at 10. The clamping device 10 includes a fastener 12, a clamping member 14, a platen 16 and a stop 18. The fastener 12 may be a standard flat-headed bolt having a threaded shank or shaft 26 and a tapered head 20 with a flat, top surface 22 and a taper 24. The taper 24 forms an outer peripheral bearing surface.

The clamping member 14 is a plate with a top face 30, a bottom sliding face or surface 32 and a plurality of sides. One or more notches 80 may be provided in the clamping member 14, as described more fully below.

The clamping member has a through bore 40 and a concentric conical bore 42. The conical bore 42 forms an inner peripheral bearing surface 44 which is linearly engaged by the outer tapered peripheral bearing surface 24 of the fastener 12. Preferably, the tapered surfaces have a contact angle between 30° and 45° as measured from the longitudinal axis of the fastener 12.

The platen 16 provides a mounting base having a working or sliding surface 46 from which the stop 18 extends. The stop 18 may be integrally formed with the platen 16 or may be formed as a separate member secured to the platen working surface 46. A workpiece 60 positioned on the working surface between the clamping member 14 and the stop 18 will be secured and engaged by the clamping member 14 as it moves, or is urged, toward the stop 18. Thus, the workpiece is secured at the working surface 46 for any desired operation on the workpiece.

The clamping device 10 is set up for use by inserting the shaft 26 of the fastener 12 through the through bore 40 in the clamping member 14 and into engagement with the threads of the threaded bore 50 of the platen 16. As the fastener 12 is turned, the threaded shaft 26 draws the outer bearing surface of the tapered head 20 into contact with the inner bearing surface of conical bore 42 at an area of contact 70. (See FIG. 2). Further turning urges the clamping member 14 toward the stop 18 while the tapered head 20 and the area of contact 70 move downward in the conical bore 42. The clamping member 14 engages and secures the workpiece 60 against the stop 18. Upon engagement of the workpiece 60 against the stop 18, the sliding clamp 30 is simultaneously anchored to the platen 16. That is, when the sliding movement of the clamping member is "stopped", by the workpiece and stop, the downward force on the clamping member will anchor the clamping member to the platen. From this it is apparent that in addition to urging the clamping member toward the stop 18, the engagement at contact area 70 also exerts a downward force on clamping member 14.

Figure 2:
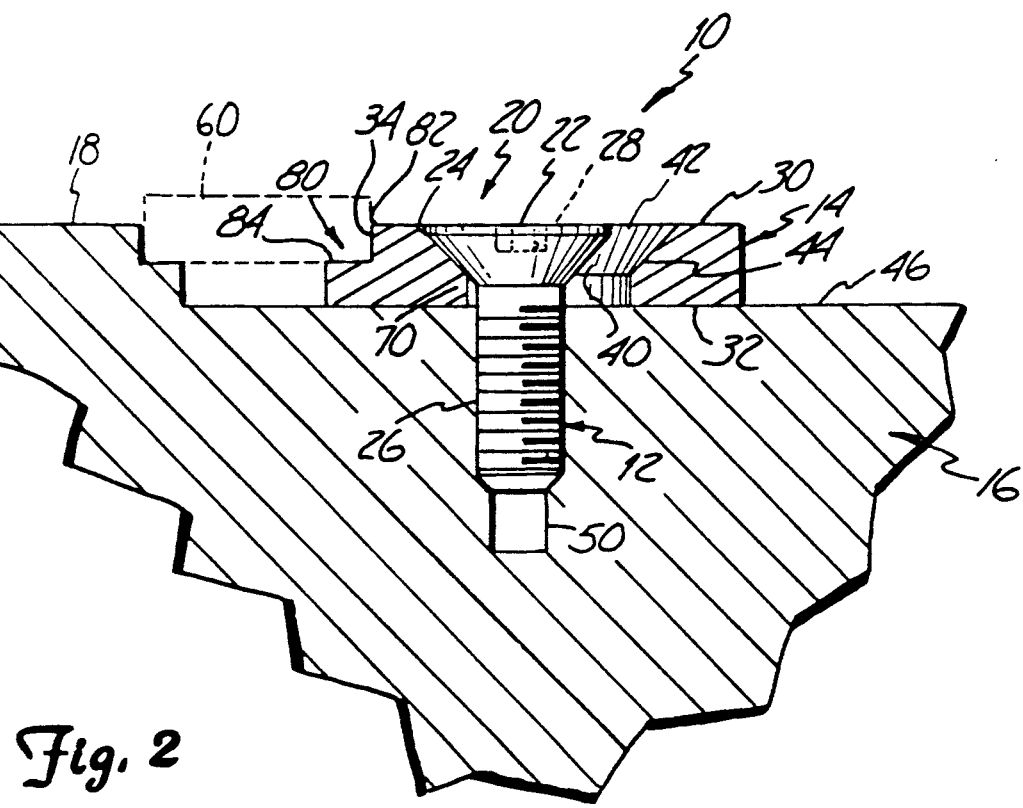
FIG. 2 is a front sectional view of the clamping device of FIG. 1.

A notch 80 may be provided on one or more sides of the clamping member 14. The notch forms a shoulder 84 on which the workpiece rests and a clamping face 34 which engages the workpiece to urge it toward the stop 18. The clamping member can be rectangular, square, hexagonal, triangular or round with the clamping face 34 suitably formed to accommodate different workpieces. A corresponding notch may appear in the stop as illustrated in FIG. 2. In addition, the clamping member 14 can clamp two parts 60A and 60B simultaneously, when the axis of the conical bore 42 is positioned between the parts 60A and 60B. The clamping member 14 can then rotate slightly about the conical bore 42 such that approximately equal clamping forces are applied to each part when the fastener 12 is tightened.

In one embodiment, the top surface 22 of the fastener head 20 has a recess 28 in the shape of a hex socket adapted for turning using an Allen wrench. Alternatively, the top surface 22 may have a slot or other recess head suitable for engagement by a conventional slotted or Phillips-type screwdriver.

As noted above, the stop 18 may be unitary with the platen 16 or a separate member secured to the platen 16. A second clamping device anchored in the platen, as described above, may serve as the stop 18.

FIG. 3 illustrates the clamping device 10 with an alternative fastener 90. The fastener 90 is similar to the fastener 10 in that it has the head 20 with the tapered side surfaces 24. However, the fastener 90 has a shank or shaft 92 that includes a lower threaded portion 94 and an upper cylindrical portion 96. The lower threaded portion 94 mates with corresponding threads in a lower portion 98 of a bore 100, while the upper cylindrical portion 96 slides within a cylindrical upper portion 102 of the bore 100. The upper cylindrical portion 96 improves the rigidity of the fastener 90 over that of the fastener 12 since the minor diameter for the threads are not present. Preferably, the length of the upper cylindrical portion 96 is approximately one to one and a half times the diameter of the shaft 92. The lower threaded portion 94 provides an actuator to draw the tapered head 20 downward. As described above, a second clamping device 89 anchored in the platen 16 may serve as the stop 18.

The present invention provides a device for holding a workpiece or an assembly part in which a clamping member has both transverse and axial forces imparted to it by the action of a single member, the bolt 12 or 90 in the illustrated embodiments. In this manner, the clamping member secures a workpiece against a stop and is, itself, anchored.

Although the present invention has been described with reference to preferred embodiments, workers skilled in the art will recognize that changes may be made in form and detail without departing from the spirit and scope of the invention. For example, the tapered head 24 and bore 42 are both described as conical. Alternatively, any surface configuration such as a surface of revolution, may be employed for one or both of the inner and outer bearing surfaces so long as their interaction provides a contact area 70 which imparts transverse and axial forces to the clamping members.

What is claimed is:

1. A clamping device for holding a workpiece comprising:
   a platen having a working surface including a stop;
   a clamping member having a sliding face adapted for sliding movement along the platen working surface and at least one clamping face adapted to engage a workpiece; and
   actuating means for simultaneously anchoring the clamping member to the platen on the platen working surface while moving the clamping member toward the stop, wherein the actuating means is secured into the platen along a fixed reference axis intersecting with the platen working surface and includes a tapered bearing surface engaging the clamping member wherein the simultaneous anchoring and moving is caused only by movement of the tapered bearing surface toward the platen working surface parallel to the reference axis.

2. The device of claim 1 wherein the stop is unitary with the platen.

3. The device of claim 1 wherein the stop is a separate member secured to the platen working surface.

4. The device of claim 7 wherein the stop comprises a second clamping member and means for anchoring the second clamping member to the platen working surface.

5. The device of claim 1 wherein the clamping face comprises a notch having a shoulder for supporting the workpiece and a face for engaging the workpiece.

6. The device of claim 1 wherein the clamping member includes a conical bore defining an inner peripheral bearing surface, the actuating means being inserted eccentrically through the conical bore and into engagement with a portion of the inner bearing surface.

7. The device of claim 2 wherein the actuating means comprises a fastener having a tapered head, the tapered head defining the tapered bearing surface.

8. The device of claim 3 further comprising a threaded bore within the platen the fastener comprising threaded shank means for cooperation with the platen threaded bore, the threaded shank means centered on a common axis with the tapered head.

9. The device of claim 3 wherein the fastener includes a recess in a surface of the head, the recess being engageable by a tool for turning the fastener.

10. The device of claim 3 wherein the platen includes a bore having a lower threaded portion and a cylindrical portion between the lower threaded portion and the platen working surface, and wherein the fastener includes a shank having threaded shank means for cooperation with the lower threaded portion and cylindrical shank means for cooperation with the cylindrical portion.

11. A clamping device for holding a workpiece comprising:
    a platen having a working surface including a stop;

a clamping member having a sliding face adapted for sliding movement along the platen working surface and at least one clamping face adapted to engage a workpiece; and a fastener secured into the platen defining a central axis, the fastener having a bearing surface concentrically positioned about the central axis, the bearing surface engaging the clamping member for simultaneously anchoring the clamping member to the platen on the platen working surface while moving the clamping member toward the stop.

12. The device of claim 11 wherein the clamping member includes a conical bore defining an inner peripheral bearing surface, the fastener being inserted eccentrically through the conical bore and into engagement with a portion of the inner bearing surface.

13. The device of claim 12 wherein the fastener includes a tapered head, the tapered head defining the bearing surface.

14. The device of claim 13 further comprising a threaded bore within the platen the fastener comprising threaded shank means for cooperation with the platen threaded bore.

15. The device of claim 13 wherein the fastener includes a recess in a surface of the head, the recess being engageable by a tool for turning the fastener.

16. The device of claim 11 wherein the stop is unitary with the platen.

17. The device of claim 11 wherein the stop is a separate member secured to the platen working surface.

18. The device of claim 17 wherein the stop comprises a second clamping member and means for anchoring the second clamping member to the platen working surface.

19. The device of claim 11 wherein the clamping face comprises a notch having a shoulder for supporting the workpiece and a face for engaging the workpiece.

20. The device of claim 13 wherein the platen includes a bore having a lower threaded portion and a cylindrical portion between the lower threaded portion and the platen working surface, and wherein the fastener includes a shank having threaded shank means for cooperation with the lower threaded portion and cylindrical shank means for cooperation with the cylindrical portion.

* * * * *

UNITED STATES PATENT AND TRADEMARK OFFICE
CERTIFICATE OF CORRECTION

PATENT NO. : 5,310,299
DATED : May 10, 1994
INVENTOR(S) : Leon M. Bernstein

It is certified that error appears in the above-indentified patent and that said Letters Patent is hereby corrected as shown below:

Column 4, line 35, delete "7" and insert --3--.

Signed and Sealed this

Eighteenth Day of October, 1994

Attest:

BRUCE LEHMAN

*Attesting Officer*   *Commissioner of Patents and Trademarks*